Aug. 9, 1932.  E. J. HOFFMANN  1,870,909
SALES OR ADVERTISING LETTER
Filed April 24, 1929
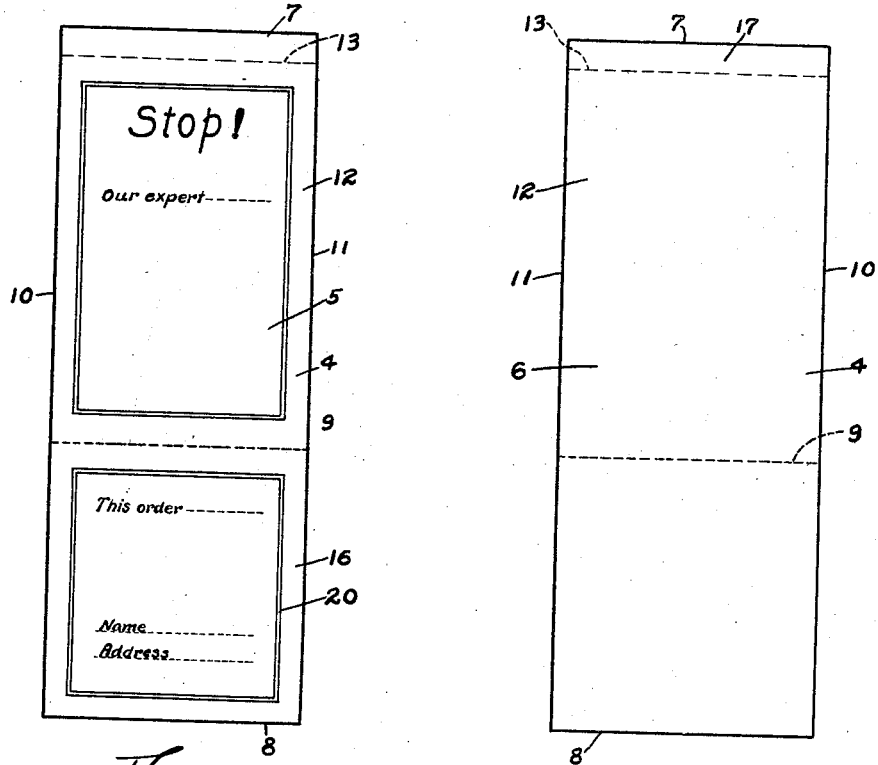
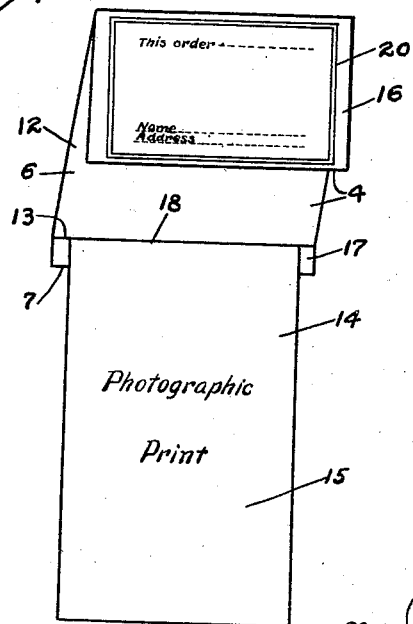

Patented Aug. 9, 1932

1,870,909

UNITED STATES PATENT OFFICE

EDWARD J. HOFFMANN, OF CINCINNATI, OHIO

SALES OR ADVERTISING LETTER

Application filed April 24, 1929. Serial No. 357,725.

This invention relates to an advertising or sales letter, an object of which is to present certain information or advertising material in a manner which will be pleasing and attractive to a recipient thereof.

Another object is to provide a sheet folded and printed in a manner that will permit attachment thereto of various and different objects of interest to various recipients.

Another object is to provide such a letter with a detachable tab or memorandum whereby may be secured the correct name and address of a recipient taking advantage of inducements offered in another portion of the letter.

These and other objects are attained by the means described herein and disclosed in the accompanying drawing, in which:

Fig. 1 is a front plan view of the sheet in flat or unfolded condition.

Fig. 2 is a rear plan view of the sheet shown in Fig. 1.

Fig. 3 is a perspective view showing the manner of using the sheet.

The advertising or sales letter of this invention is a preferably rectangular sheet of paper 4 having a front face 5 bearing printed or written matter, and a blank rear face 6. Intermediate the top and bottom edges 7 and 8, the sheet is perforated or scored, as indicated at 9, transversely of the sheet at right angles to the side edges 10 and 11. The upper and larger portion 12 of the divided sheet 4 is bent upon itself transversely thereof, along an imaginary line parallel to and spaced from the top edge 7, as indicated at 13. The distance between said line 13 and the perforated or scored line 9 preferably is equal to, or slightly in excess of, the length of a standard size photograph 14. The front face 15 of the photograph is adapted to be covered, normally, by the upper portion 12 of sheet 4, the blank side 6 thereof being in contact with the face of the photograph. The lower portion 16 may be disposed normally with its back upon the back of the photograph.

On the back of the sheet 4, between the top edge 7 and line 13, is applied a coating of gum indicated at 17. Upon moistening the gum, the top portion of the photograph back may be attached to the glued flap 17, the top edge 18 of the photograph being positioned adjacent to line 13.

In use, the photograph is attached in the manner just described, and the face 15 is covered by the upper portion 12. Upon the front face of the upper portion 12 appears an inducement to the effect that an enlarged photograph of the one enclosed will be made for the recipient at an attractive price. The group of words forming the inducement preferably is surrounded by a border line 19. The lower portion or tab 16 is an order blank, similarly bordered as at 20, upon which the recipient writes his name and address. This tab, when returned by the recipient, may subsequently be used in sales promotion work, since it bears the addressee's correct name and address, and also indicates that such person is one who might appreciate receiving advertising matter relating to photography or a kindred subject.

The sales or advertising letter herein described and illustrated may advantageously be used, for instance, by a merchant who operates a photo developing business in connection with a sales agency for cameras, camera films and other supplies of a like nature. Upon receiving from a customer a group of films to be developed, the photographer or developer might, if he chose, select from the customer's group a photograph which, in the opinion of the developer, is a good example of amateur photography. This photograph thereupon will be attached to the sales letter herein described, and forwarded to the customer. If, after reading the inducement contained in the sales letter, the customer decides to take advantage thereof, he signs the order blank and inserts also his post office address. He then returns the sales letter and attached photograph and otherwise complies with the instructions contained in the letter. Upon receipt of the letter the photographer makes an enlargement of the photograph and otherwise fulfills his agreement with the customer, retaining for his own information or for the information of others, the tab bearing the correct name and address of the customer.

In this manner, the merchant or photographer can acquire a select list of customers who are interested to some extent in the merchandise handled by him.

What is claimed is:

A return mailing envelope for a photograph comprising a paper photograph, a folder-sheet substantially equal in width to said photograph, said folder-sheet being permanently fastened at one end to the back of the photograph, another portion of the folder covering the face of the photograph and bearing reading matter related to the photograph, the opposite end portion of the folder-sheet being connected by a weakened tearing-off line and folded on said line over against the back of the photograph and bearing other reading matter relating to the photograph, said folder constituting a protecting covering for the face of the photograph.

In testimony whereof, I have hereunto subscribed my name this 20th day of April, 1929.

EDWARD J. HOFFMANN.